United States Patent
Gray et al.

(10) Patent No.: US 7,322,603 B2
(45) Date of Patent: Jan. 29, 2008

(54) SEAT BELT SYSTEM INCLUDING AN AIRBAG

(75) Inventors: Mark F. Gray, Sterling Heights, MI (US); Ahad M. Zadeh, Rock Hills, MI (US); Chris Hall, Algonac, MI (US); Robert F. Rogers, Orion, MI (US)

(73) Assignee: Takata Seat Belts, Inc., Auburn Hills, MI (US)

( * ) Notice: Subject to any disclaimer, the term of this patent is extended or adjusted under 35 U.S.C. 154(b) by 160 days.

(21) Appl. No.: 11/170,511

(22) Filed: Jun. 29, 2005

(65) Prior Publication Data

US 2007/0001435 A1    Jan. 4, 2007

(51) Int. Cl.
B60R 21/18    (2006.01)
(52) U.S. Cl. .................................... 280/733
(58) Field of Classification Search ............. 280/733, 280/801.1
See application file for complete search history.

(56) References Cited

U.S. PATENT DOCUMENTS

| | | |
|---|---|---|
| 3,706,462 A | 12/1972 | Lilly |
| 5,062,662 A | 11/1991 | Cameron |
| 5,511,820 A | 4/1996 | Hatfield |
| 5,794,971 A | 8/1998 | Boydston et al. |
| 5,871,230 A | 2/1999 | Lewis |
| RE36,587 E * | 2/2000 | Tanaka et al. ............ 280/733 |
| 6,109,647 A | 8/2000 | Akaba et al. |
| 6,126,194 A | 10/2000 | Yaniv et al. |
| 6,352,282 B2 | 3/2002 | Hirose |
| 6,382,667 B1 | 5/2002 | Aoki |
| 6,419,264 B1 | 7/2002 | Tsuji et al. |
| 6,688,642 B2 | 2/2004 | Sollars, Jr. |
| 6,698,790 B2 * | 3/2004 | Iseki et al. ............ 280/733 |
| 2002/0027344 A1 | 3/2002 | Decomps et al. |
| 2002/0067031 A1 | 6/2002 | Busgen et al. |

* cited by examiner

Primary Examiner—Faye M. Fleming
(74) Attorney, Agent, or Firm—Fitch, Even, Tabin & Flannery

(57) ABSTRACT

A seat belt system, in one form, includes a buckle anchored along the side of the seat, a tongue slidably mounted on the seat belt for being latched in the buckle to define the shoulder and lap belt portions, and a retractor for pay in and pay out of the seat belt into and out from the retractor. The airbag is fixed to the tongue and configured for sliding along the seat belt so that with the tongue latched in the buckle the airbag extends along the same position irrespective of the size of the occupant. Alternatively, the airbag is fixed to a guide loop adjacent to the shoulder of the occupant and configured to allow for sliding of the seat belt relative thereto so that with the tongue latched in the buckle the airbag extends from the same position and across the occupant's torso irrespective of the size of the occupant.

24 Claims, 7 Drawing Sheets

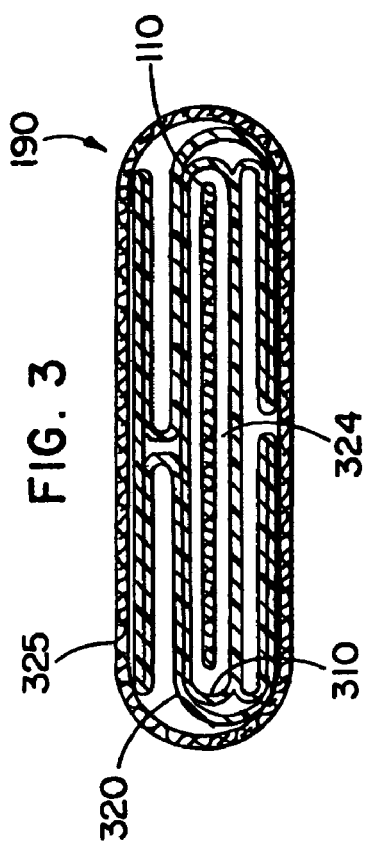
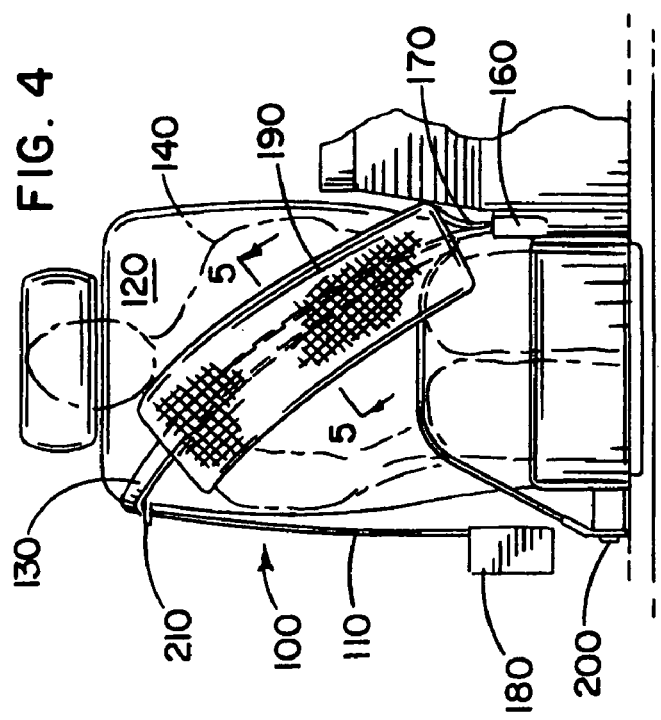
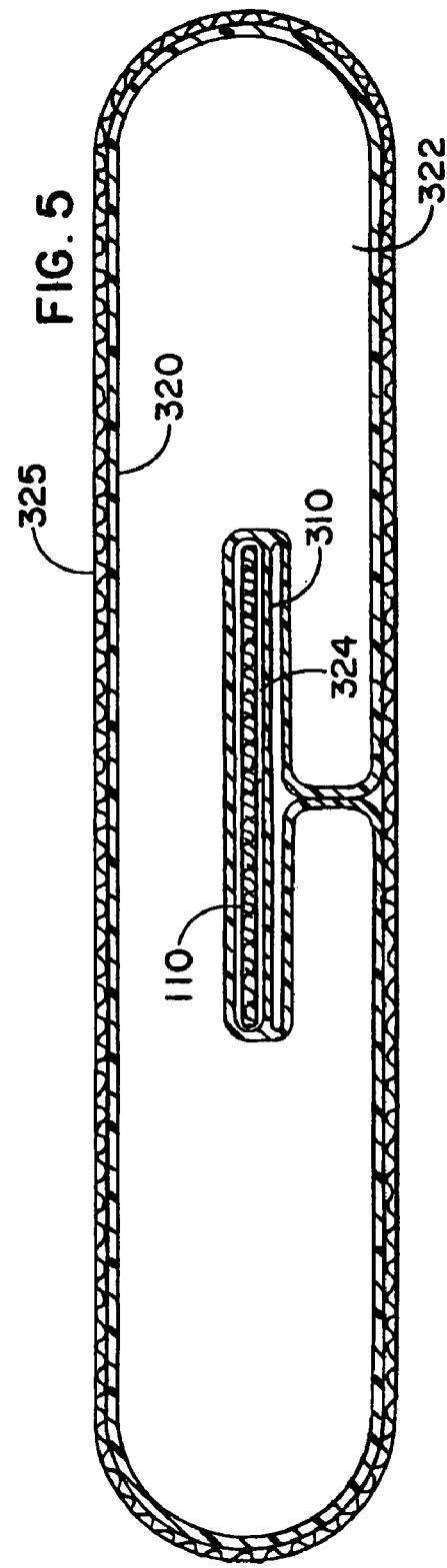

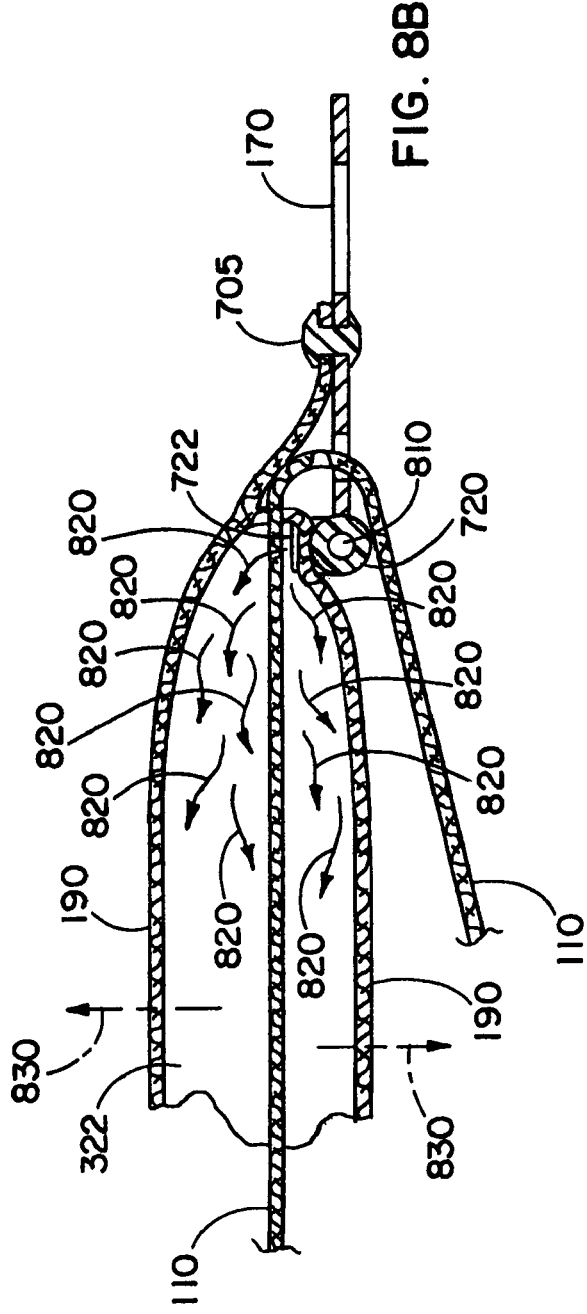
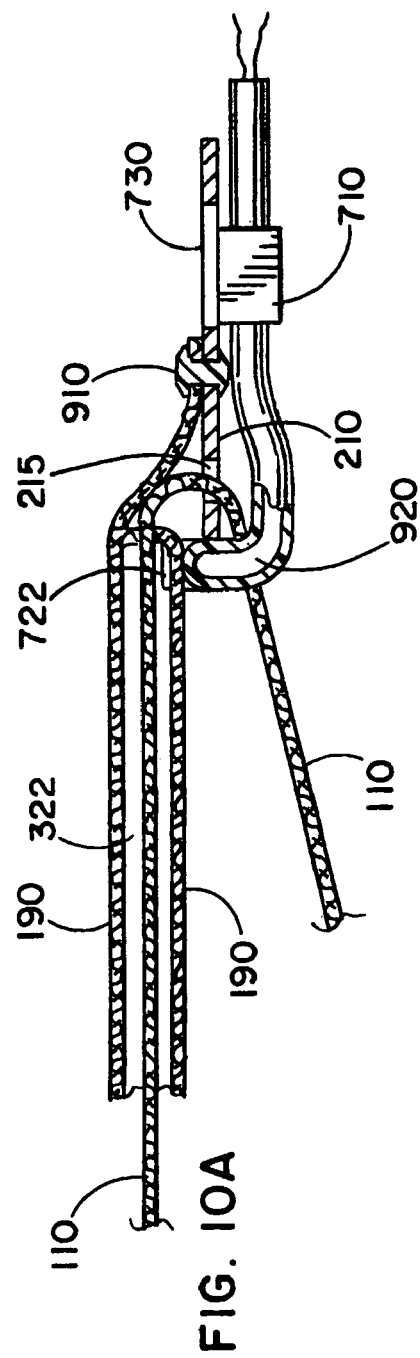
FIG. 8B
FIG. 10A

SEAT BELT SYSTEM INCLUDING AN AIRBAG

TECHNICAL FIELD

The present invention relates generally to systems for protecting occupants of moving vehicles, for example, in a crash situation. More specifically, the invention relates to an apparatus including an inflatable airbag associated with a seat belt worn by an occupant of a moving vehicle.

BACKGROUND OF THE INVENTION

Various airbag systems are known in the art for inflating upon the impact of a moving vehicle to provide protection against injury of a passenger or occupant of the moving vehicle. Airbags can be placed in various places relative to an occupant of a vehicle to provide varying amounts of protection while minimizing the risk of injuring the occupant during the normal operation of the airbag. For example, airbags are commonly placed in the steering wheel or dashboard of an automobile such that when the automobile experiences a head on collision, the airbag will inflate to minimize the injury to a passenger occupying one of the front seats of the vehicle. The airbag, however, in operation, must inflate at a rapid rate of speed. Because the airbag is located opposite the passenger in the steering wheel or dashboard of the automobile, the airbag in operation expands toward the passenger, sometimes striking the passenger with an undesirable amount of force.

To minimize this undesirable airbag impact, various known airbag systems place the inflatable airbag in close proximity to the passenger such that in operation, the airbag will inflate away from the body of the occupant and still provide the desired injury protection as that of conventional steering wheel or dashboard based airbag systems. These known alternative airbag systems place the airbag in a variety of positions. For example, certain known systems provide for an airbag system independent of the vehicle. These systems, however, require the occupant to properly place and otherwise configure the airbag system on the seat belt, seat belt buckle, or other portion of the vehicle. It is desirable that passenger protection systems such as an airbag system be usable without affirmative occupant action or intervention beyond that normally required to secure the seat belt about the seat occupant to minimize the risk of mishandling by the occupant and to reduce the inconvenience of the occupant.

In other known airbag systems, the airbag is integrated with the seat belt or a portion thereof. The airbag portions of such systems, however, typically experience undesired wear because of the retraction of the airbag portion through guide loops and into retractors during normal use of the seat belt.

U.S. Pat. No. 6,419,264 discloses an airbag that is integrated with a shoulder belt portion of the seat belt. The shoulder belt airbag is too large to fit through the upper, guide loop, and even if it could it would not be able to be retracted onto the spool of the retractor in a practical way. Accordingly, systems like this generally necessitate the use of multiple retractors to provide some flexibility at least at the lap belt portion of the seat belt system. As is apparent, it would be desirable to reduce the number of retractors in a given seat belt system for cost reduction purposes.

SUMMARY OF THE INVENTION

Generally speaking, pursuant to various embodiments, an airbag for receiving inflation gas includes a seat belt passageway. The seat belt passageway of the airbag slidably receives the seat belt such that the airbag freely slides along the length of the seat belt. The airbag is attached to a tongue, which also is slidably along the seat belt. Alternatively, the airbag is attached to a guide loop approximately adjacent to the shoulder of the occupant so that the seat belt slides relative to the airbag. In both instances, the airbag and seat belt are slidable relative to each other.

So configured, the slidable airbag is consistently placed in a proper position for providing maximum protection for the occupant with virtually no extra effort on the part of the occupant beyond fastening the seat belt. Because the airbag and tongue are slidable relative to the seat belt, the airbag need not be withdrawn through a guide loop or into a retractor during normal use thereby limiting wear and tear on the airbag. Further, the slidable airbag preferably allows for the use of only a single retractor in the seat belt system.

BRIEF DESCRIPTION OF THE DRAWINGS

The above needs are at least partially met through provision of the seat belt slidable airbag apparatus described in the following detailed description, particularly when studied in conjunction with the drawings, wherein:

FIG. 3 is a cross-sectional view taken along line 3-3 of FIG. 2 showing an annular construction of the sliding airbag about the seat belt;

FIG. 4 is an elevational view similar to FIG. 2 with the slidable airbag inflated;

FIG. 5 is a cross-sectional view taken along line 5-5 FIG. 4 showing a cover extending about the inflated airbag;

FIG. 8B is a cross-sectional view similar to FIG. 8A showing inflation of the airbag;

FIG. 10A is a cross-sectional view of the airbag, inflation mechanism, and tongue of FIG. 9;

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

Figure 1:
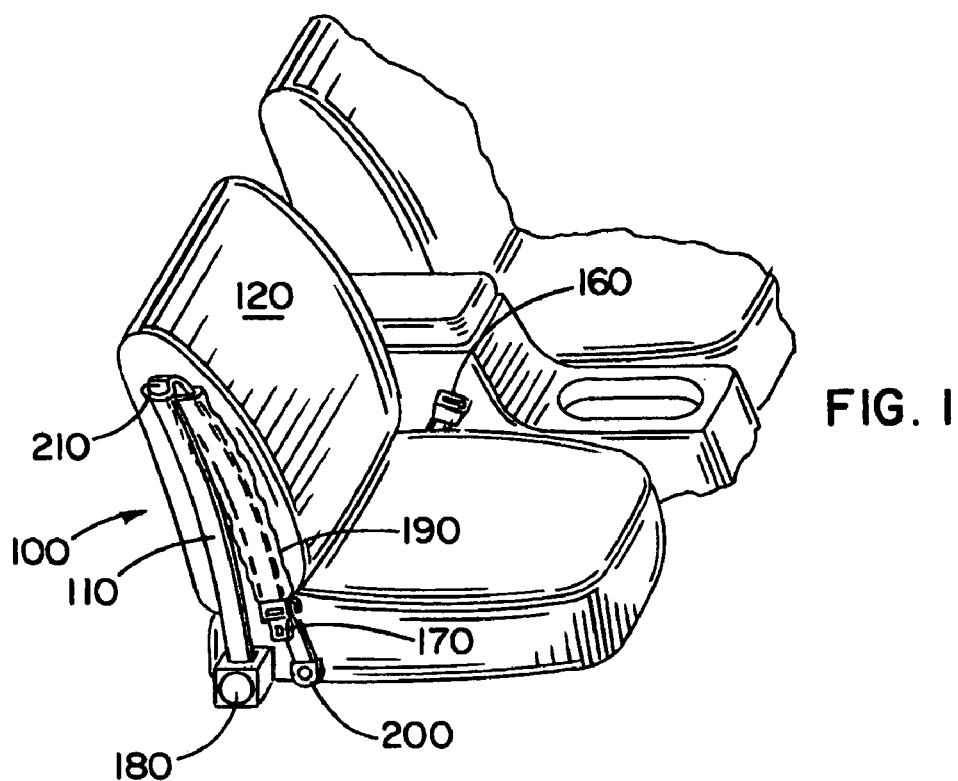
FIG. 1 is a perspective view of a seat belt system for a vehicle occupant seat with a slidable airbag as configured in accordance with an embodiment of the invention.
Figure 2:
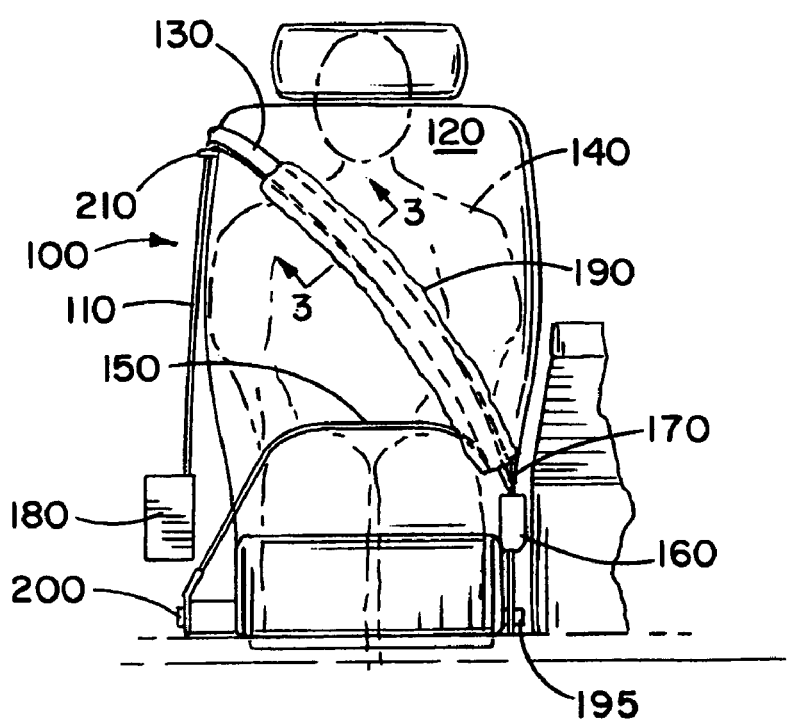
FIG. 2 is an elevational view of the vehicle seat with an occupant wearing a seat belt with the slidable airbag extending across the upper torso of the occupant.

Referring now to the drawings, and in particular to FIGS. 1 and 2, a seat belt system 100 includes a seat belt 110 associated with a seat 120 of a vehicle. The seat belt 110 includes a shoulder belt portion 130 that extends across the upper torso of the occupant 140 of the seat 120 from shoulder to midriff. The seat belt 110 also includes a lap belt portion 150 that extends across the lap of the occupant 140. The seat belt system 100 further includes a buckle 160 anchored along one side of the seat 120, typically the inboard side, and a tongue plate 170 that is slidably mounted on the seat belt 110 in a slot opening 175 (FIG. 8A) in the tongue plate 170 through which the belt 110 extends. The tongue 170 may be releasably latched in the buckle 160 thereby defining the shoulder belt portion 130 and the lap belt portion 150 of the seat belt 110. The seat belt system 100 also includes a retractor 180 for pay in and pay out of the seat belt 110 into and out of the retractor 180. The airbag 190 is fixed to the tongue 170 and configured to slide along the shoulder belt portion 130 so that when a user slides the tongue 170 along the belt 110 for latching it in the buckle 160, the airbag 190 also slides along the belt 110 and, after tongue plate latching, extends along the shoulder belt portion 130 from the same position, i.e. adjacent the tongue/buckle interface, irrespective of the size of the occupant 140 of the seat 120.

So configured, the seat belt system 100 has a standard three-point anchor configuration with anchor points, such as anchor 195 and anchor 200, on either side of the seat 120 for the lap belt portion 150 and a raised anchor point along the side of the seat opposite the buckle 160, typically the outboard side, for the shoulder belt portion 130. The anchor points securely attach the seat belt system 100 to the body of the vehicle as is known in the art. Other seat belt arrangements could also be employed for the seat belt system 100 herein.

Figure 7:
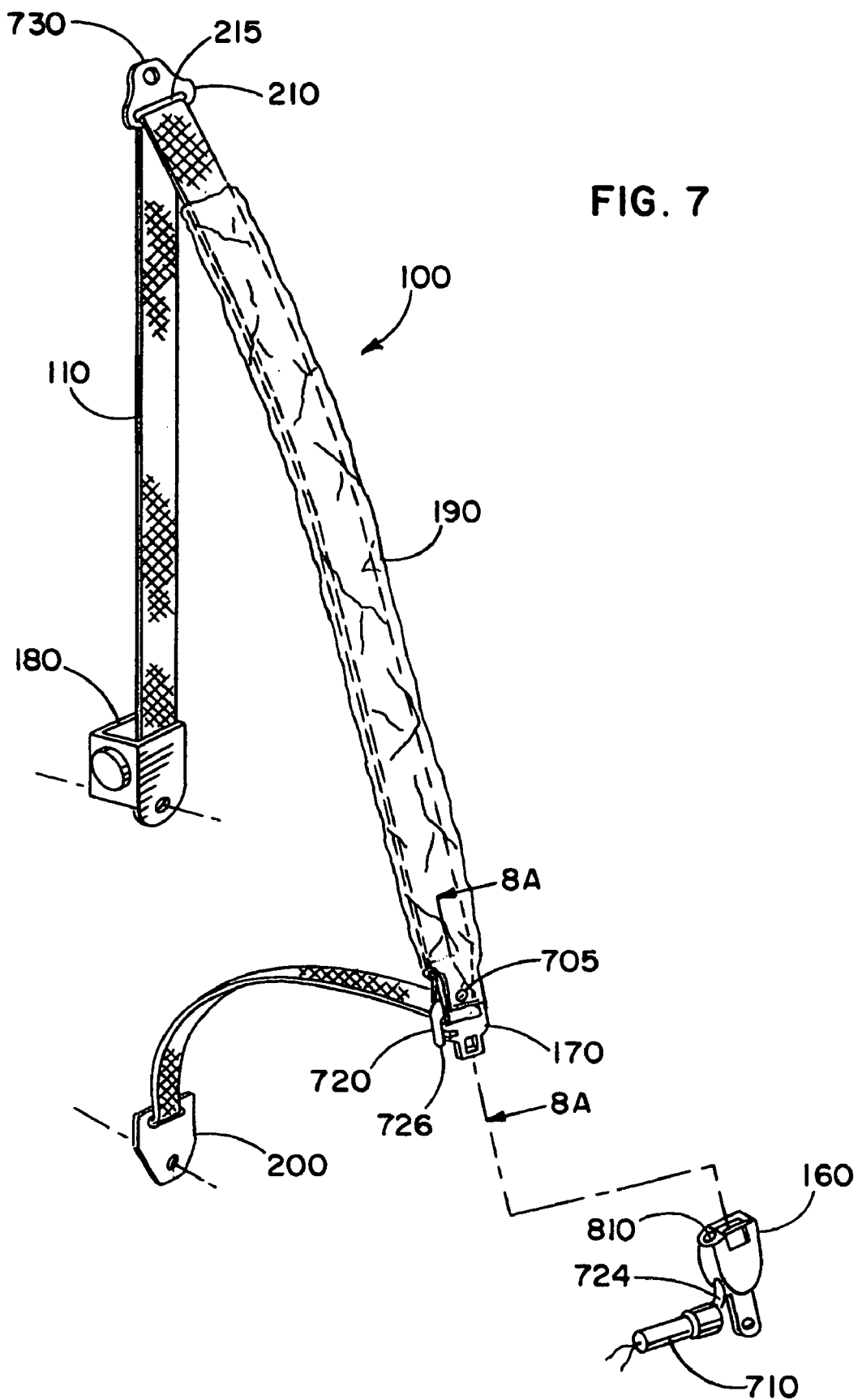
FIG. 7 is a perspective view of the seat belt system showing a tongue plate and cooperating buckle.

The raised anchor point, as illustrated in FIG. 7, has a mounting flange 730 that may be anchored to the vehicle as by bolting. Also, the mounting flange 730 may be integral with a guide loop 210 or alternatively otherwise attached to the guide loop 210. Further, the guide loop 210 may be adjustable via known height adjusting mechanisms as anchors along a pillar of the vehicle. The seat belt 110 extends through a slot opening 215 of the guide loop 210 and is redirected down to the retractor 180 that is also anchored to the vehicle, such as behind the trim.

The retractor 180 of the seat belt system 100 also preferably and advantageously comprises the only retractor for the seat belt 110. By having the tongue 170 and airbag 190 configured so that they are not fixed to the seat belt 110 or seat belt arrangements, such as the illustrated described three-point arrangement, the airbag 190 can be employed without requiring additional retractors to provide flexibility for accommodating differently sized seat occupants.

A preferred embodiment of the airbag 190 will be described with reference to FIG. 3. The airbag 190 preferably has an annular configuration so that the airbag 190 may extend about the seat belt 110 for sliding along a portion thereof, such as the shoulder belt portion 130. To this end, the airbag 190 has inner and outer tubular side walls or wall portions 310 and 320 that can be sewn together at their ends to form an inflation space 322 therebetween. Inner wall portion 310 is adjacent to the seat belt 110 and defines a seat belt passageway 324 so that the seat belt 110 can extent therethrough. The wall portion 310 preferably embodies a low friction material for ease of sliding the airbag along the wall portion 310. For example, the wall portion 310 may include a Teflon liner that allows passage of the seat belt 110 through the airbag 190 with reduced friction.

Preferably, the tubular outer wall portion 320 includes a mesh webbing 325 that extends about the airbag 190 when in its collapsed or folded condition prior to deployment and inflation. The mesh webbing 325 is operable to maintain the airbag 190 in its folded condition so that it has a small profile relative to the size of the seat belt providing minimum discomfort to the occupant and a minimum aesthetic effect on the seat belt system 100. The airbag's profile, preferably, is still large enough relative to the guide loop 210 to prevent passage of the airbag 190 through the guide loop slot 215. Further, the airbag 190 prior to inflation includes sufficient structural stiffness in addition to the reduced friction with the seat belt 110 to avoid crimping or bunching of the airbag 190 during normal use.

Figure 6:
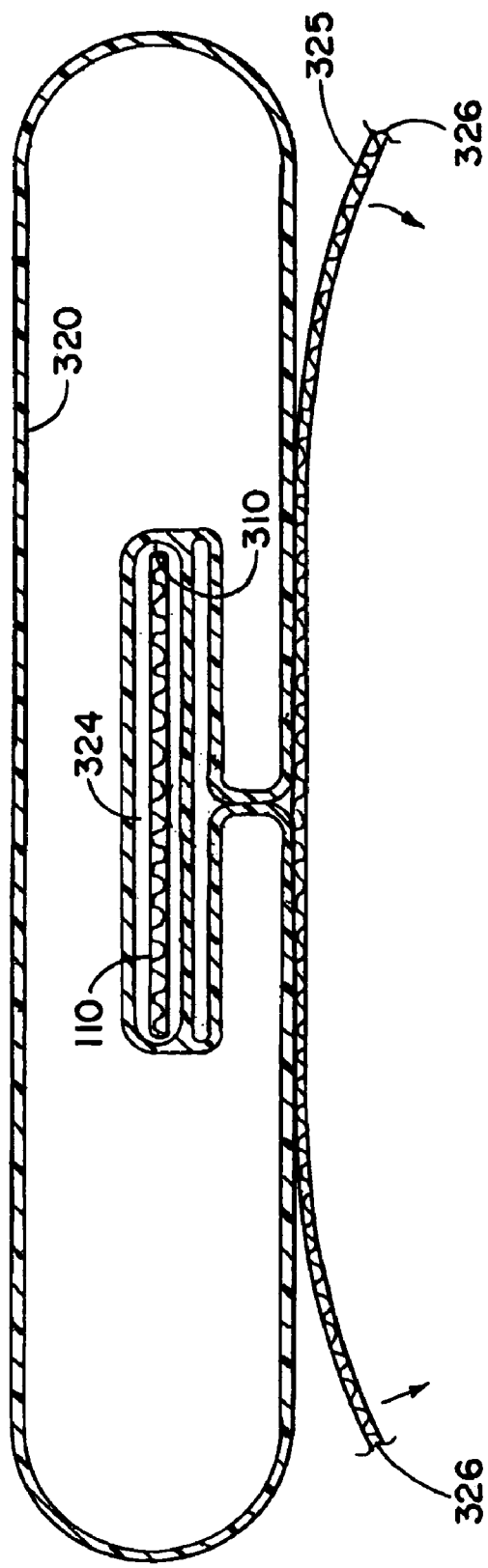
FIG. 6 is a cross-sectional view similar to FIG. 5 with an alternative cover that releases from the airbag upon airbag deployment.

FIGS. 4 and 5 depict the airbag 190 in an inflated state. Upon impact the airbag 190 is inflated by an inflation mechanism such as that described in U.S. Pat. No. 6,419,264, which is incorporated by reference as if reproduced in its entirety herein, or other equivalent means known in the art. The inflated airbag 190 substantially covers the torso of the occupant 140 thereby providing protection for the occupant 140. Upon inflation, a pressurized gas, such as air, is directed into the annular space 322 between airbag walls 310 and 320 for rapidly filling the airbag 190 causing it to unfold and expand around the seat belt 110. This expansion stretches the mesh webbing 325 and may push the wall portion 310 against and around the seat belt 110. The mesh webbing 325 can flexibly stretch and define the final inflation configuration for the airbag 190. Alternatively, the mesh webbing 325 may include a frangible or breakable seam 326 that tears upon inflation of the airbag 190 as illustrated in FIG. 6. In a similar embodiment, the mesh webbing 325 includes a seam 327 between it and the airbag outer wall 320 such that the mesh webbing 325 is released from the outerwall 320 along the seam during inflation. In another alternative, the mesh webbing 325 enclosing the foldable airbag 190 may be replaced by cloth or other suitable fabric that readily tears upon inflation of the airbag 190.

Figure 8A:
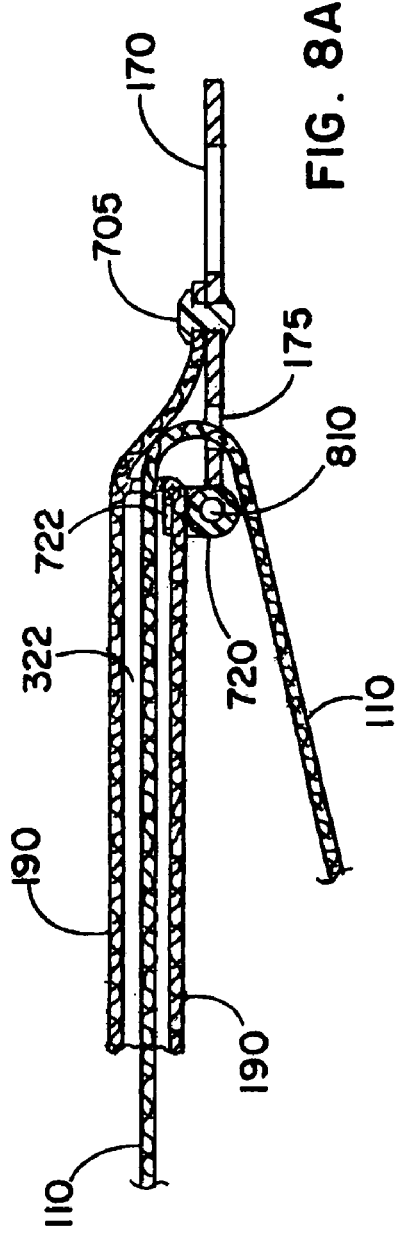
FIG. 8A is a cross-sectional view taken along line 8A-8A of FIG. 7 showing the seat belt extending through a slot of the tongue plate and a fixed connection between the airbag and tongue plate.

The inflation of the airbag 190 will now be described in more detail with reference to FIGS. 7, 8A, and 8B. The airbag 190 is preferably secured at its lower end to the tongue 170 by fastener 705. The buckle 160 connects to the airbag inflation mechanism including gas generator 710 such that a fluid passageway 810 to the airbag 190 from the gas generator 170 is formed when the tongue 170 is releasably latched in the buckle 160. Alternatively, the inflation mechanism 710 may be contained within the buckle 160. A nozzle 720 for receiving the inflation gas is secured to the tongue 170 and connected to the airbag 190 so that its outlet 722 is disposed in airbag space 322. The airbag 190 is sealed about the nozzle 720 for this purpose. A gas pipe 724 extends to an inlet of a gas passageway 810 integrated into the buckle 160, and the inlet 726 of the nozzle 720 seats in the outlet of the gas passageway 810 when the tongue 170 and buckle 160 are latched together. Thus, the nozzle 720, gas passageway 810 and pipe 724 provide a gas flowpath between the gas generator 710 and the airbag 190 for supplying inflation gas 820 to the airbag 190. When the airbag 190 inflates, the generator 710 provides the pressurize fluid or gas 820 that travels through the pipe 724, passageway 810, and nozzle 720 and then into the airbag 190 thereby causing the airbag 190 to expand in a direction generally transverse to the length of the seat belt 110 as indicated by the arrows 830.

In an alternative embodiment, the airbag 190 is fixed to the guide loop 210 instead of the tongue 170. In this embodiment, the airbag 190 similarly extends along the shoulder belt portion 130 from the same position irrespective of the size of the occupant 140 of the seat 120 when the tongue 170 latches in the buckle 160. An additional advantage of this embodiment includes the provision of increased head and neck support by the airbag 190 in the case of a side collision of the vehicle because of the consistent placement of the airbag 190 at or near the shoulder of the occupant 140 when the airbag 190 is anchored to the guide loop 210.

Figure 9:
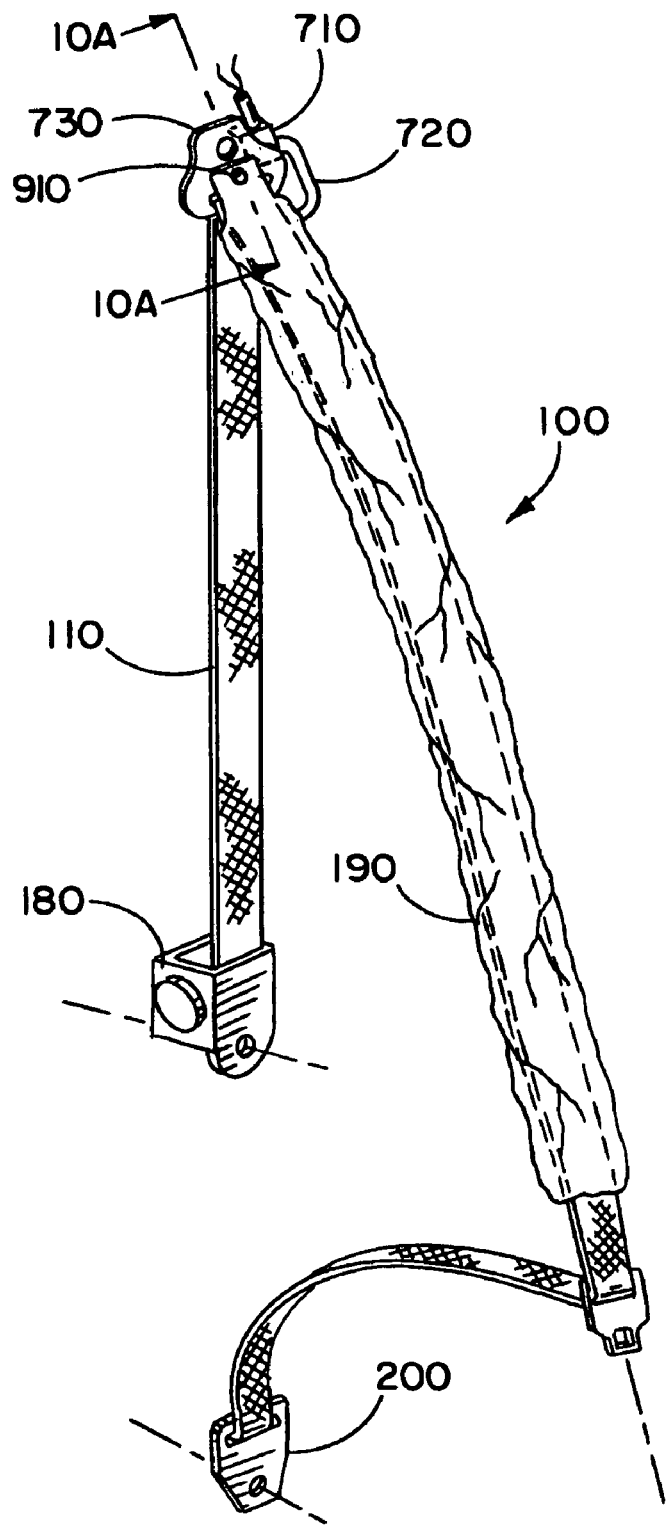
FIG. 9 is a perspective view of a seat belt system with an airbag as configured in accordance with various embodiments of the invention.
Figure 10B:
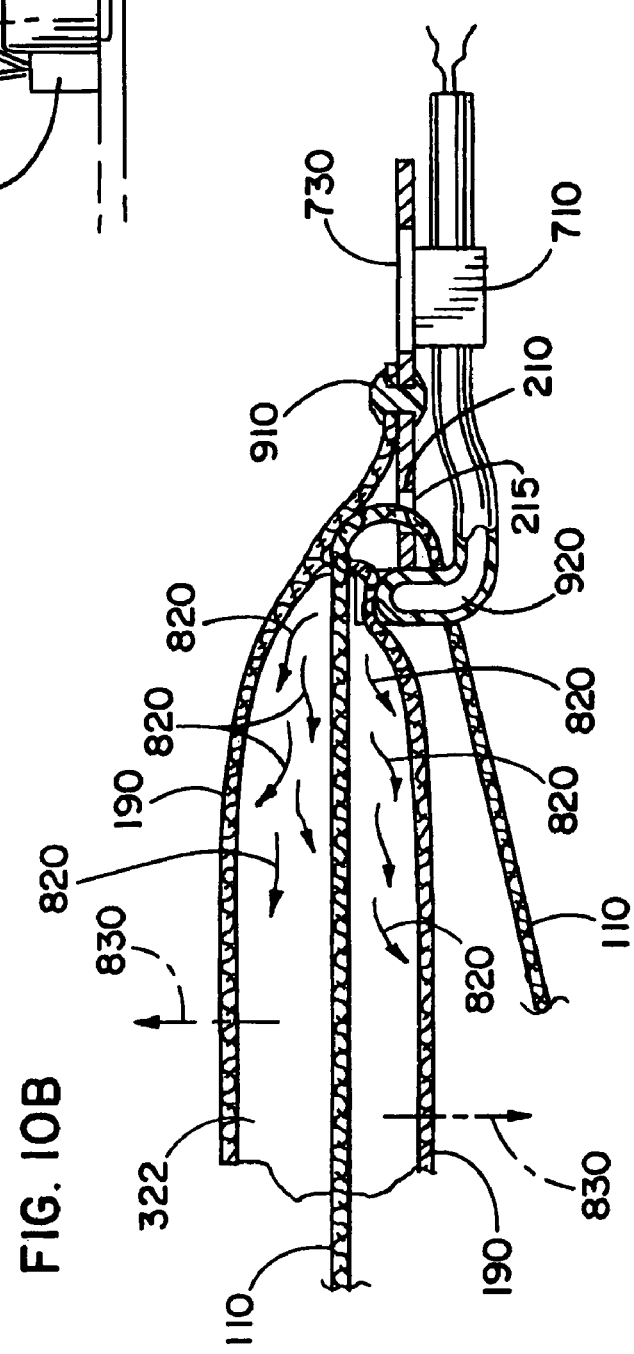
FIG. 10B is a cross-sectional view of the airbag when inflated, inflation mechanism, and tongue of FIG. 9

This alternative embodiment is further described with reference to FIGS. 9, 10A, and 10B. The airbag 190 is secured at its upper end to the guide loop 210 by fastener 910. The guide loop 210 has an associated inflation device or mechanism 710 for supplying the inflation gas to the airbag 190. The inflation mechanism 710 is preferably mounted to the guide loop 210, however, the inflation mechanism 710 may be otherwise provided adjacent to the guide loop 210. A dedicated fluid passageway 920 runs between the inflation mechanism 710 and the airbag 190. This configuration provides the additional advantage of removing the reliance on the mating of the nozzle 720 with the inflation mechanism 710 to complete the fluid passageway 920. In operation, the airbag 190 operates substantially similar as described above, wherein the inflation mechanism 710 provides the inflation gas 820 to the airbag 190 through passageway 920 thereby causing the airbag 190 to expand as indicated by the arrows 830.

Advantageously, the relatively slidable airbag and seat belt may be easily integrated into a conventional three-point seat belt system as described above. So configured, the airbag is properly positioned without effort by the occupant beyond buckling the occupant's seat belt. The airbag does not detract from the comfort or aesthetics of the seat belt, and the airbag resists bunching or other excessive wear and tear. Further, the airbag is properly placed without necessitating more than one seat belt retractor.

Figure 11:
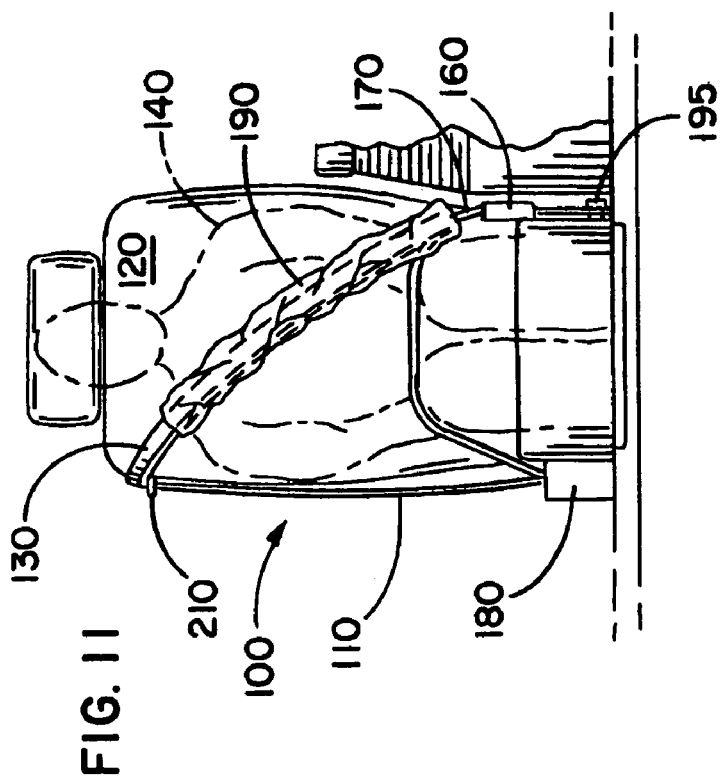
FIG. 11 is an elevational view of the vehicle seat with an occupant wearing a seat belt with the airbag as configured in accordance with an embodiment of the invention.

Those skilled in the art will recognize that a wide variety of modifications, alterations, and combinations can be made with respect to the above described embodiments without departing from the spirit and scope of the invention. For example, an alternative configuration as illustrated in FIG. 11 demonstrates that the retractor may be included in the same housing as a lower anchor point. Such modifications, alterations, and combinations are to be viewed as being within the ambit of the inventive concept.

We claim:

1. A seat belt system comprising:
   a seat belt associated with a seat of a vehicle;
   a shoulder belt portion of the seat belt for extending across a torso of an occupant of the seat;
   a lap belt portion of the seat belt for extending across a lap of an occupant of the seat;
   a buckle anchored along the side of the seat;
   a tongue slidably mounted on the seat belt for being latched in the buckle to define the shoulder and lap belt portions extending therefrom;
   a single retractor for the seat belt for pay in and pay out of the seat belt into and out from the retractor;
   a guide loop for being positioned approximately adjacent to a shoulder of the occupant of the seat for slidably receiving the seat belt; and
   an airbag fixed to one of the tongue and the guide loop and configured to allow the shoulder belt portion to slide relative thereto so that with the tongue latched in the buckle the airbag extends along the shoulder belt portion from the same position irrespective of the size of an occupant of the seat.

2. The seat belt system of claim 1 wherein the seat belt has a standard three-point anchor configuration with anchor points on either side of the seat for the lap belt portion, and a raised anchor point along the side of the seat opposite the buckle for the shoulder belt portion.

3. The seat belt system of claim 1 wherein the airbag has an annular configuration so that the airbag extends about the seat belt for sliding relative to the shoulder belt portion thereof.

4. The seat belt system of claim 1 wherein the airbag is fixed to the slidable tongue, and the buckle and tongue have an inflation device associated therewith including a gas passageway formed between the latched buckle and tongue for supplying inflation gas to the airbag.

5. The seat belt system of claim 1 wherein the airbag has a wall portion adjacent the seat belt of a low friction material for ease of relative sliding between the seat belt and the airbag.

6. The seat belt system of claim 5 wherein the low friction wall portion is a low friction liner.

7. The seat belt system of claim 5 wherein the airbag has an annular configuration with a tubular outer wall portion and the low friction material comprises a tubular inner wall portion of the annular airbag.

8. A seat belt system comprising:
   an airbag for receiving inflation gas;
   a seat belt passageway of the airbag for receiving a seat belt slidably therethrough;
   ends of the airbag that are not fixed to the seat belt for sliding therealong; and
   a tongue attached to one of the airbag ends and slidably movable on the seat belt so that the tongue and the airbag slide together along the seat belt as the tongue is slid therealong.

9. The seat belt system of claim 8 further comprising:
   an airbag inflation mechanism;
   a buckle connected to the airbag inflation mechanism such that the airbag inflation mechanism completes a fluid passageway to the airbag when the tongue engages the buckle.

10. The seat belt system of claim 8 wherein the airbag is foldable around the seat belt.

11. The apparatus of claim 9 further comprising:
    a seat belt anchor attached to a first end of the seat belt;
    a retractor attached to a second end of the seat belt; and
    wherein the seat belt anchor, the retractor, and the buckle define a three point seat belt system.

12. The apparatus of claim 9 further comprising:
    a nozzle for receiving gas, the nozzle secured to the tongue and connected to the airbag such that the airbag inflation mechanism engages the nozzle when the tongue engages the buckle.

13. The apparatus of claim 9 wherein the airbag is of a sufficient length to extend from the buckle substantially across a passenger's torso when the tongue engages the buckle.

14. The apparatus of claim 9 wherein the airbag is of a sufficient length to extend from the buckle substantially across a passenger's lap when the tongue engages the buckle.

15. The apparatus of claim 8 further comprising a mesh webbing enclosing the airbag.

16. The apparatus of claim 9 wherein the airbag inflation mechanism is contained within the buckle.

17. A seat belt system comprising:
   a seat belt associated with a seat of a vehicle;
   a shoulder belt portion of the seat belt for extending across a torso of an occupant of the seat;
   a lap belt portion of the seat belt for extending across a lap of an occupant of the seat;
   a guide loop for being positioned approximately adjacent to a shoulder of an occupant of the seat for slidably receiving the seat belt;
   an airbag fixed to the guide loop and configured to allow the shoulder belt portion to slide relative thereto so that the airbag extends along the shoulder belt portion from the same position irrespective of the size of an occupant of the seat.

18. The seat belt system of claim 17 including a single retractor for the seat belt.

19. The seat belt system of claim 17 wherein the seat belt has a standard three-point anchor configuration with anchor points on either side of the seat for the lap belt portion, and a raised anchor point along the side of the seat opposite the buckle for the shoulder belt portion.

20. The seat belt system of claim 17 wherein the airbag has an annular configuration so that the airbag extends about the seat belt to allow the seat belt to slide relative thereto.

21. The seat belt system of claim 17 wherein the guide loop has an inflation device associated therewith for supplying inflation gas to the airbag.

22. The seat belt system of claim 17 wherein the airbag has a wall portion adjacent the seat belt of a low friction material for ease of sliding the seat belt relative to the airbag.

23. The seat belt system of claim 22 wherein the low friction wall portion is a low friction liner.

24. The seat belt system of claim 22 wherein the airbag has an annular composition with a tubular outer wall portion and the low friction material comprises a tubular inner wall portion of the annular airbag.

* * * * *